United States Patent
Ali-Yrkkö

(10) Patent No.: US 6,256,611 B1
(45) Date of Patent: Jul. 3, 2001

(54) CONTROLLING A TELECOMMUNICATION SERVICE AND A TERMINAL

(75) Inventor: Olli Ali-Yrkkö, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/119,535

(22) Filed: Jul. 20, 1998

(30) Foreign Application Priority Data

Jul. 23, 1997 (FI) .......................................... 973093

(51) Int. Cl.[7] .................................................. G10L 15/00
(52) U.S. Cl. ............................................................ 704/275
(58) Field of Search .................................. 704/275, 270, 704/251; 379/88.03; 455/563

(56) References Cited

U.S. PATENT DOCUMENTS

| | | | |
|---|---|---|---|
| 4,081,607 | * 3/1978 | Vitols | 704/237 |
| 4,227,177 | * 10/1980 | Moshier | 704/231 |
| 4,763,350 | 8/1988 | Immendorfer et al. | 379/67 |
| 4,945,570 | * 7/1990 | Gerson et al. | 455/563 |
| 5,020,107 | * 5/1991 | Rohani et al. | 704/275 |
| 5,042,063 | * 8/1991 | Sakanishi et al. | 379/88.03 |
| 5,218,668 | * 6/1993 | Higgins et al. | 704/200 |
| 5,440,662 | * 8/1995 | Sukkar | 704/236 |
| 5,509,104 | * 4/1996 | Lee et al. | 704/245 |
| 5,640,485 | * 6/1997 | Ranta | 704/251 |
| 5,649,057 | * 7/1997 | Lee et al. | 704/256 |
| 5,659,597 | * 8/1997 | Bareis et al. | 704/251 |
| 5,675,706 | * 10/1997 | Lee et al. | 704/256 |
| 5,710,864 | * 1/1998 | Juang et al. | 704/238 |
| 6,073,095 | * 6/2000 | Dharanipragada et al. | 704/242 |

FOREIGN PATENT DOCUMENTS

| | | |
|---|---|---|
| 0 293 259 A3 | 11/1988 | (EP) . |
| 0 618 710 A3 | 10/1994 | (EP) . |
| 0 762 709 A2 | 3/1997 | (EP) . |
| 0 788 268 A1 | 8/1997 | (EP) . |

* cited by examiner

Primary Examiner—David D. Knepper
(74) Attorney, Agent, or Firm—Perman & Green, LLP

(57) ABSTRACT

Prior to a call, a command vocabulary (13) and control signals (14) corresponding to the command words are stored in the terminal. A phone number is dialed (21) and the call is connected. Speech from the user is received (24) in the terminal. A command word in the user's speech (26) is recognized (25) in the terminal. A control signal corresponding to the command word is read (27) in the terminal, and the control signal read is sent (28) from the terminal to the system in order to control the telecommunication service. The control signal is formed e.g. of a dual tone multifrequency (DTMF) code sequence.

11 Claims, 3 Drawing Sheets

CONTROLLING A TELECOMMUNICATION SERVICE AND A TERMINAL

BACKGROUND OF THE INVENTION

The invention relates to a method for controlling a telecommunication service as defined in the preamble of claim 1 and to a terminal defined in the preamble of claim 6.

From the prior art one knows that a telecommunication service can be controlled using number pad keys and DTMF tones. This is inconvenient, especially with a mobile phone, as first one has to listen to the prompt holding the mobile phone against one's ear, then the mobile phone has to be lowered down for the push-buttons to be pressed and then the apparatus has to be raised back to the ear. This has to be repeated until all the desired actions have been performed.

Prior-art speech recognisers used in terminals recognise the phone number or name of the called party. A telephone number is dialled on the basis of the recognition and a call is established. Before this, the user teaches the terminal the individual numbers and names both in speech and dialling the corresponding numbers. A stored phone number in the terminal corresponds to the name of the called party.

A problem with the prior-art devices is that the speech recogniser can only be used for the recognition of individual numbers or the name of the called party and not for any other purposes.

The use of speech recognition (SR) in telecommunication systems is known such that in an exchange or in a service associated with the exchange, voice commands are recognised. Such services, however, are rare and most of the services require that the user dials numbers during the call.

A problem with the prior-art speech recognisers is that they are rare, so that most of the current services have to be used by means of a keypad. Another problem is unreliable speech recognition due to differences in the voices of users.

An object of the invention is to provide a new method for controlling telecommunication services and thereby eliminate the disadvantages mentioned above.

SUMMARY OF THE INVENTION

The method according to the invention is characterised by what is expressed in claim 1. The terminal according to the invention is characterised by what is expressed in claim 6. Preferred embodiments of the invention are described in the sub-claims.

The invention relates to a method for controlling a telecommunication service. In accordance with the invention the method comprises the steps of: storing a command vocabulary by speech as well as the electric control signals corresponding to the command words in a terminal, dialling a phone number and connecting a call, receiving speech from a user in the terminal, recognising a command word in the user's speech, reading a control signal corresponding to that command word in the terminal, and sending the control signal read from the terminal to the system in order to control the telecommunication service.

In an application of the invention the command vocabulary and the corresponding control signals are stored in the following steps: the terminal is set into the command vocabulary input state, a command word is uttered, a control signal is fed to the terminal, and the command word and the corresponding control signal are stored.

In an application of the invention the control signal comprises a dual tone multifrequency (DTMF) code sequence. User of an ordinary mobile phone presses push-buttons to make voice mail selections, for example.

In an application of the invention the command vocabulary is at least partly telecommunication service specific. Telecommunication service specific means here that the command word can have different control signal when using different telecommunication service. This can be accomplished at least by many different command vocabularies that comprise a same word linked to different control signals.

In an application of the invention a telecommunication service is identified on the basis of the phone number dialled on the terminal. The telecommunication service is identified to choose from possibly many to the command word linked control signals a control signal that is specific to the identified telecommunication service.

The invention also relates to a terminal. In accordance with the invention, the terminal comprises means for receiving speech from the user and transmitting a control signal corresponding to a recognised command word, means for transmission and reception for establishing a connection with a telecommunication service, transmitting the control signal corresponding to the recognised command word and receiving prompts from the telecommunication service, means for listening to the prompts of the telecommunication service, and means for inputting information such as control signals and phone numbers, speech recogniser means for recognising a spoken command word, a control unit for controlling the terminal and a display for presenting results.

In an embodiment of the invention the speech recogniser is realised using a digital signal processor and memory circuits.

In an embodiment of the invention the means for receiving speech from said user is a separate hands-free microphone. The terminal has for this operating mode a separate microphone and loudspeaker for remotely operating the apparatus.

In an embodiment of the invention the terminal is a mobile communications device.

An advantage of the invention is that it is not necessary to separately recall and speak or enter individual number selections of a command sequence which may be hard to remember, but a series of several number selections can be activated by uttering a single word corresponding to the command sequence.

Another advantage of the invention is the reliability of speech recognition after the user has taught the speech recogniser in his or her own voice the command words used to activate the control signals. Then the audio reference stored in the command vocabulary and the user's voice match as accurately as possible.

A further advantage of the invention is that the use of the keypad during a call can be avoided. This is preferable in a mobile phone as the use of the keypad during a call is particularly difficult with a mobile phone.

BRIEF DESCRIPTION OF THE DRAWINGS

The invention is described in more detail with reference to the accompanying drawing wherein.

DETAILED DESCRIPTION OF THE INVENTION

Figure 1:
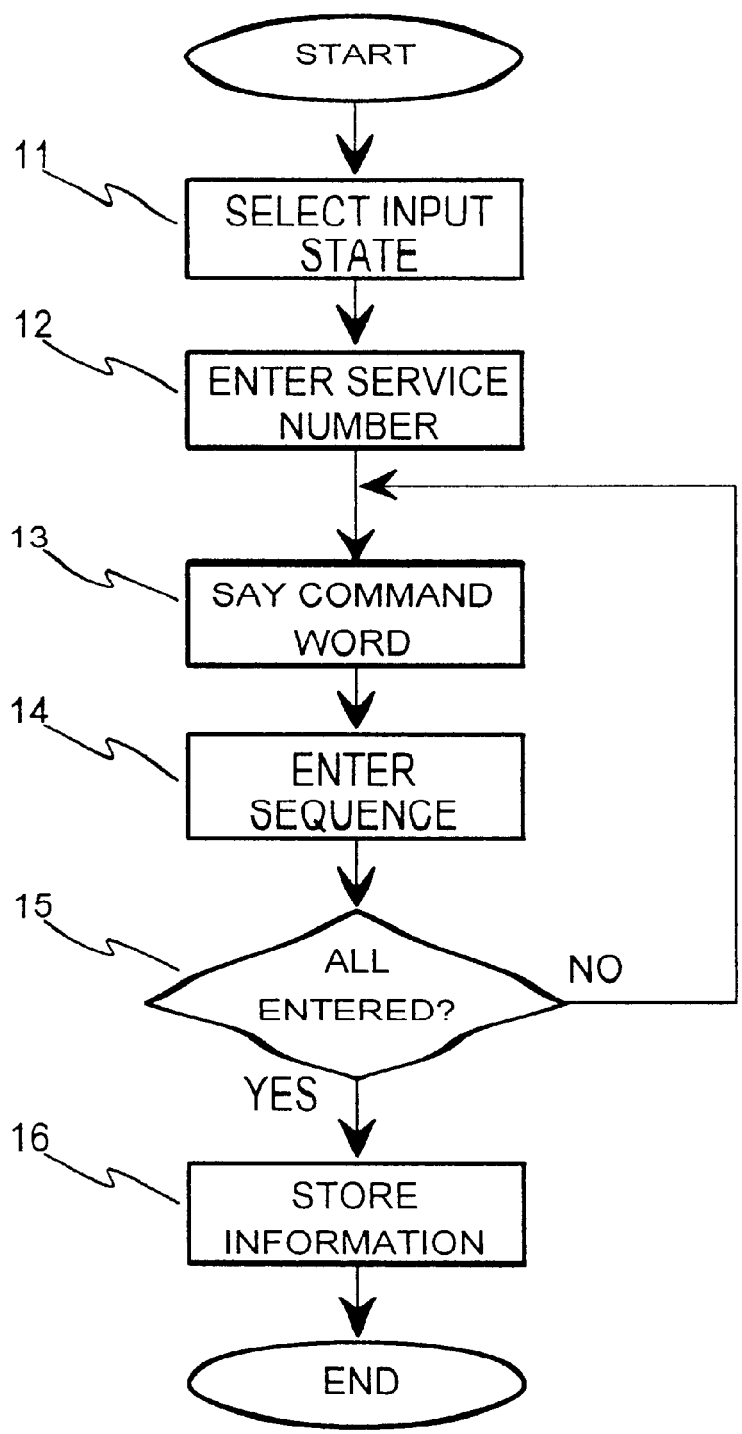
FIG. 1 illustrates in the form of flow diagram the storing of a command vocabulary in a terminal in accordance with the invention.

FIG. 1 illustrates in the form of flow diagram a method according to the invention for storing a command vocabulary in a terminal. The user selects the command vocabulary input state by means of push-buttons 11 and selects 12 the number of the telecommunication service with which the command vocabulary in question is associated. A command word 13 is uttered to the terminal and then a push-button sequence 14 corresponding to the command word is entered to generate a control signal. It is checked whether all words of the command vocabulary have been entered 15 and then either the input is terminated and the data input are stored 16 or the input of the next command word is started.

Figure 2:
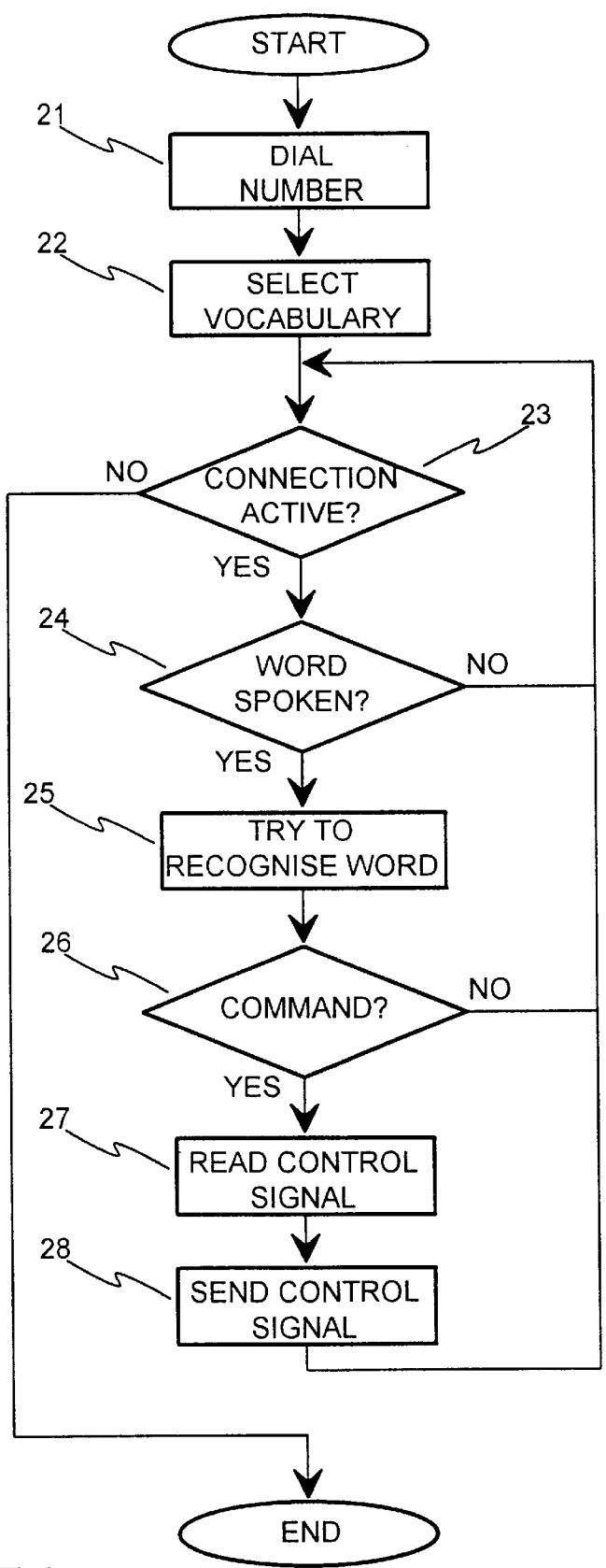
FIG. 2 illustrates in the form of flow diagram a method according to the invention.

FIG. 2 illustrates in the form of flow diagram a method according to the invention. The user first dials a phone number 21 and the mobile phone selects the vocabulary associated with that number 22. The phone number is e.g. that of a bank service and a command vocabulary optimised for bank services is associated with it in the terminal. Next it is checked whether the connection is active 23, i.e. whether the call attempt was put through and whether the service answered the call. If the connection is active the process moves on to the next state and if not, it terminates. In the next step 24 it is examined whether the user uttered a word and if so, the process moves on to recognise the word 25 and if not, it returns to step 23. When a word is being recognised 25, it is compared to command words stored in the apparatus, such as "accounts". On the basis of the comparison the process branches as follows: when the word is not a command word, the process returns to step 23, but when it is a command word, the corresponding control signal 27 is read in the terminal. When the control signal has been read 27, a control signal 28 corresponding to the command word is sent to the telecommunication service, in this case the bank service, said control signal being preferably a series of sounds formed of DTMF tones. Then the process returns to step 23 to wait for the next command word, start of the service or disconnection of the call.

Figure 3:
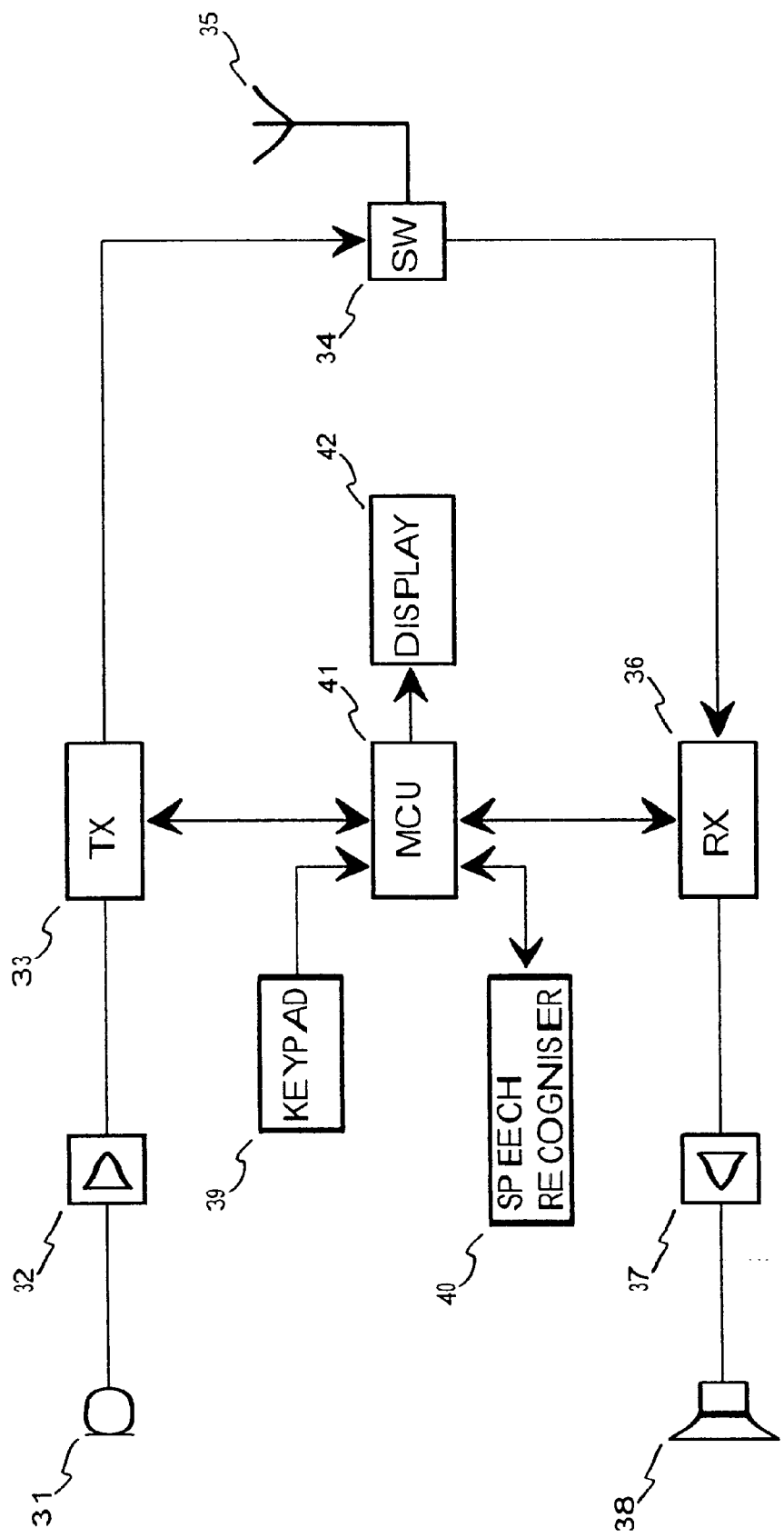
FIG. 3 shows in the form of block diagram essential elements of a mobile communications device according to the invention.

FIG. 3 shows essential elements of a mobile communications device according to the invention. The mobile communications device comprises on the transmission side a microphone 31, microphone amplifier 32 and a transmitter part 33. Parts common to transmission and reception include a duplex switch 34 and an antenna 35. On the reception side the mobile communications device comprises a receiver part 36, earphone amplifier 37 and an earphone 38. In addition, the mobile communications device includes a keypad 39, speech recogniser 40, control part 41 and a display 42. During the training stage of the speech recogniser 40 or during speech recognition, sound is taken from the microphone 31 to the speech recogniser 40 controlled by the control part 41. A separate hands free microphone can be used instead of the mobile phone's microphone 31. The speech recogniser 40, which is known per se, is typically realised using essentially a digital signal processor (DSP) and memory circuits.

As an example, let us consider a case of calling a service number for which one has to produce successive DTMF tones in order to activate a given function. One such service number is a voice mailbox offered by GSM operators (GSM=Global System for Mobile communications). A voice mailbox is used by calling a service number and entering number sequences transmitted as DTMF tones. The number sequences are used to enter a password and select a desired function in the logical tree structure of the service. When using the method according to the invention, the terminal, in this case the mobile communications device, recognises the service number as a voice mailbox number and actives the vocabulary associated with it. When the call has been set up, the user utters a command word which corresponds to the function desired and which is recognised in the speech recogniser of the mobile communications device and found in the vocabulary. In the vocabulary a control signal corresponds to the word, and DTMF tones according to that control signal are sent to the voice mailbox just as the user would enter the number sequence by pressing individual push-buttons. Thus a function of a voice mailbox or the like requiring a long and hard-to-remember command sequence is easily started by uttering a command word of the appropriate vocabulary, which the user can easily remember. Such words to be recognised are e.g. "previous", "next", "wait", etc.

A telecommunication service specific vocabulary is e.g. as follows:

| command word | control signal |
| --- | --- |
| password | 1234 |
| listen | #1 |
| next | #2 |
| previous | #3 |
| save | #4 |
| delete | #5 |

The vocabulary is preferably stored by the user in the mobile communications device as described above; alternatively, the user downloads the vocabulary corresponding to the service via an infrared (IR) link or communications interface.

The invention can be applied in a mobile communications device that has no display or even a keypad. A mobile communications device without a keypad would be controlled solely by voice.

A control signal may also consist of signals other than DTMF tones. Such signals may be e.g. feature vectors produced in the speech recognition process.

The invention is not limited to the application examples described above but many modifications are possible within the scope of the inventional idea defined by the claims set forth below.

What is claimed is:

1. A method for controlling a telecommunication service, comprising the steps of:

storing in a terminal a command vocabulary, where a command word corresponds to at least one control signal, there being a set of command words with corresponding control signals constituting a category that is related to a particular telecommunication service, dialing a phone number and connecting a call, wherein the phone number identifies a telecommunication service, the terminal selecting a category that is related to the telecommunication service identified by the dialed phone number as a basic set of command words to be recognized, receiving speech from a user in said terminal during a connected call, recognizing a command word in said terminal from said user's speech, during the connected call, wherein the command word belongs to the selected category, reading one of said at least one control signal corresponding to said command word in said terminal, and sending said control signal read from said terminal to system to control the telecommunication service.

2. The method of claim 1, wherein said command vocabulary and corresponding control signals are stored in the following steps:

said terminal is set into said command vocabulary input state, a command word is uttered, a control signal is fed to said terminal, and said command word and said corresponding control signal are stored.

3. The method of claim 1, wherein said control signal comprises a DTMF code sequence.

4. The method of claim 1, wherein said command vocabulary is at least partly telecommunication service specific.

5. The method of claim 4, wherein the telecommunication service is identified on a basis of a phone number dialed on said terminal.

6. A terminal, comprising means being operative during a connected call, namely:

means for storing a command vocabulary wherein a command word corresponds to at least one control signal, there being a set of command words with corresponding control signals constituting a category that is related to a particular telecommunication service, means for receiving speech from a user and transmitting a control signal corresponding to a recognized command word, means for transmission and reception for establishing a connection with a telecommunication service, transmitting said control signal corresponding to said recognized command word and for receiving prompts from said telecommunication service, means for listening to prompts from said telecommunication service, and means for inputting information such as control signals and phone numbers, said inputting means including means for selecting a category that is related to the telecommunication service identified by a dialed phone number as a basic set of command words to be recognized, speech recognizer means for recognizing a spoken command word, wherein the command word belongs to the selected category, and a control unit for controlling the terminal and a display for presenting results.

7. The terminal of claim 6, wherein said speech recognizer is realized using a digital signal processor and memory circuits.

8. The terminal of claim 6, wherein the means for receiving speech from said user is a separate hands-free microphone.

9. The terminal of claim 6, wherein the terminal is a mobile communications device.

10. A method for controlling a telecommunication service, comprising the steps of:

storing in a terminal a command vocabulary, where a command word corresponds to at least one control signal, there being a set of command words with corresponding control signals constituting a category that is related to a particular telecommunication service, dialing a phone number and connecting a call, wherein the phone number identifies a telecommunication service, the terminal selecting a category that is related to the telecommunication service identified by the dialed phone number as a basic set of command words to be recognized, receiving speech from a user in said terminal during a connected call, wherein the speech comprises both command and non-command words, recognizing a command word of said category in said terminal from said user's speech during the connected call, wherein said recognizing includes a distinguishing between command and non-command words, reading one of said at least one control signal corresponding to said command word in said terminal, and sending said control signal read from said terminal to system to control the telecommunication service.

11. A terminal, comprising means being operative during a connected call, namely:

means for storing a command vocabulary wherein a command word corresponds to at least one control signal, there being a set of command words with corresponding control signals constituting a category that is related to a particular telecommunication service, means for receiving speech from a user and transmitting a control signal corresponding to a recognized command word, means for transmission and reception for establishing a connection with a telecommunication service, transmitting said control signal corresponding to said recognized command word and for receiving prompts from said telecommunication service, means for listening to prompts from said telecommunication service, and means for inputting information such as control signals and phone numbers, said inputting means including means for selecting a category that is related to the telecommunication service identified by a dialed phone number as a basic set of command words to be recognized, speech recognizer means for recognizing a spoken command word, control unit for controlling telecommunication service, the terminal and a display for presenting results, wherein the connection provides for communication of speech, the speech comprises both command and non-command words, and said recognizing includes a distinguishing between command and non-command words.

* * * * *

UNITED STATES PATENT AND TRADEMARK OFFICE
CERTIFICATE OF CORRECTION

PATENT NO. : 6,256,611 B1
DATED : July 3, 2001
INVENTOR(S) : Olli Ali-Yrkko

It is certified that error appears in the above-identified patent and that said Letters Patent is hereby corrected as shown below:

<u>Title page,</u>
The title, CONTROLLING A TELECOMMUNICATION SERVICE AND A TERMINAL" should read -- METHOD FOR CONTROLLING A TELECOMMUNICATION SERVICE AND A TERMINAL --.

Signed and Sealed this

Twenty-sixth Day of March, 2002

*Attest:*

JAMES E. ROGAN
*Attesting Officer* — *Director of the United States Patent and Trademark Office*